(12) United States Patent
Hwang

(10) Patent No.: US 9,276,250 B2
(45) Date of Patent: Mar. 1, 2016

(54) BATTERY ARRAY AND BATTERY PACK HAVING THE SAME

(75) Inventor: Kum-Yul Hwang, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 13/040,241

(22) Filed: Mar. 3, 2011

(65) Prior Publication Data

US 2012/0052367 A1 Mar. 1, 2012

Related U.S. Application Data

(60) Provisional application No. 61/377,394, filed on Aug. 26, 2010.

(51) Int. Cl.
| | |
|---|---|
| *H01M 6/42* | (2006.01) |
| *H01M 2/20* | (2006.01) |
| *H01M 2/10* | (2006.01) |
| *H01M 10/42* | (2006.01) |

(52) U.S. Cl.
CPC .............. *H01M 2/204* (2013.01); *H01M 2/105* (2013.01); *H01M 2/1061* (2013.01); *H01M 10/425* (2013.01)

(58) Field of Classification Search
CPC ... H01M 2/105; H01M 10/425; H01M 2/204; H01M 2/1061
USPC .................................................. 429/159, 158
See application file for complete search history.

(56) References Cited

U.S. PATENT DOCUMENTS

| | | | | |
|---|---|---|---|---|
| 4,205,121 | A | * | 5/1980 | Naitoh ............................ 429/99 |
| 6,168,883 | B1 | | 1/2001 | Urry |
| 7,638,234 | B2 | * | 12/2009 | Naito et al. ................... 429/100 |

| | | | |
|---|---|---|---|
| 2007/0099073 | A1 | 5/2007 | White et al. |
| 2008/0113262 | A1 | 5/2008 | Phillips et al. |
| 2008/0286634 | A1 | 11/2008 | Naito |
| 2008/0286641 | A1 | 11/2008 | Yonishi |

(Continued)

FOREIGN PATENT DOCUMENTS

| | | |
|---|---|---|
| CN | 1281589 A | 1/2001 |
| CN | 201032639 Y | 3/2008 |
| CN | 201163635 Y | 12/2008 |

(Continued)

OTHER PUBLICATIONS

EPO Extended Search Report for corresponding European Patent Application No. 11178942.6, dated Dec. 12, 2011, listing the cited references, 5 pages.

(Continued)

*Primary Examiner* — Gary Harris
(74) *Attorney, Agent, or Firm* — Lewis Roca Rothgerber Christie LLP

(57) ABSTRACT

A battery array includes: a plurality of batteries arranged into 2N+1 bundles, each of the bundles including M+1 batteries of the batteries arranged in parallel (where N and M are natural numbers); a plurality of connection tabs arranged at a first end of the battery array and at a second end of the battery array, each of the connection tabs being coupled to a corresponding pair of the bundles to electrically couple a first bundle through a 2N+1th bundle of the bundles in series; a first output terminal having a first polarity, and electrically coupled to the first bundle; and a second output terminal having a second polarity, and electrically coupled to the 2N+1th bundle, the second output terminal being adjacent to the first bundle.

19 Claims, 13 Drawing Sheets

(56) References Cited

U.S. PATENT DOCUMENTS

| | | |
|---|---|---|
| 2010/0266887 A1 | 10/2010 | Sekino et al. |
| 2011/0262777 A1 | 10/2011 | Choi et al. |

FOREIGN PATENT DOCUMENTS

| | | |
|---|---|---|
| DE | 10 2007 000 504 A1 | 4/2009 |
| JP | 59-86666 U | 6/1984 |
| JP | 11-120978 | 4/1999 |
| JP | 2003-308814 | 10/2003 |
| JP | 2006-079941 | 3/2006 |
| JP | 2006-100147 | 4/2006 |
| JP | 2006-156227 | 6/2006 |
| JP | 2008-287984 | 11/2008 |
| JP | 2008-287985 | 11/2008 |
| JP | 2009-070614 | 4/2009 |
| JP | 2009-87720 | 4/2009 |
| KR | 10-2010-0041496 | 4/2010 |
| WO | WO 2010/044588 A2 | 4/2010 |

OTHER PUBLICATIONS

KIPO Notice of Allowance dated May 30, 2013, for corresponding Korean Patent application 10-2011-0078356, (1 page).

SIPO Office action dated Nov. 5, 2013, for corresponding Chinese Patent application 201110206782.0, (5 pages) and English Translation, (7 pages).

KIPO Office action dated Oct. 24, 2012, for corresponding Korean Patent application 10-2011-0078356, (7 pages).

JPO Office action dated May 7, 2013, for corresponding Japanese Patent application 2011-183449, (3 pages).

* cited by examiner

FIG. 3A

| (1,1) | (1,2) |
|---|---|
| (2,1) | (2,2) |
| (3,1) | (3,2) |
| (4,1) | (4,2) |
| (5,1) | (5,2) |

FIG. 3B

| (1,2) | (1,1) |
|---|---|
| (2,2) | (2,1) |
| (3,2) | (3,1) |
| (4,2) | (4,1) |
| (5,2) | (5,1) |

| (1,1) | (1,2) |
|---|---|
| (2,1) | (2,2) |
| (3,1) | (3,2) |
| (4,1) | (4,2) |
| (5,1) | (5,2) |

BATTERY ARRAY AND BATTERY PACK HAVING THE SAME

CROSS-REFERENCE TO RELATED APPLICATION

This application claims priority to and the benefit of U.S. Provisional Application No. 61/377,394, filed on Aug. 26, 2010, in the United States Patent and Trademark Office, the entire content of which is incorporated herein by reference.

BACKGROUND

1. Field

An embodiment of the present invention relates to a battery pack.

2. Description of Related Art

As a variety of mobile devices have been widely used in recent years, batteries, such as primary batteries and secondary batteries, are widely used.

Batteries used in industries or middle and heavy electronic apparatuses may need high output, such that high-capacity batteries are used or a plurality of standard batteries are connected to increase the output.

SUMMARY

An aspect of an embodiment of the present invention is directed toward a battery array having both electrode terminals at a short distance from each other even when a plurality of multi-batteries are arranged in parallel or in series, and a battery pack including the battery array.

According to one embodiment of the present invention, a battery array includes: a plurality of batteries arranged into 2N+1 bundles, each of the bundles including M+1 batteries of the batteries arranged in parallel (where N and M are natural numbers); a plurality of connection tabs arranged at a first end of the battery array and at a second end of the battery array, each of the connection tabs being coupled to a corresponding pair of the bundles to electrically couple a first bundle through a 2N+1th bundle of the bundles in series; a first output terminal having a first polarity, and electrically coupled to the first bundle; and a second output terminal having a second polarity, and electrically coupled to the 2N+1 th bundle, the second output terminal being adjacent to the first bundle.

The first output terminal may be at a side of a first battery of the first bundle, and the second output terminal may be at a side of a second battery of the 2N+1 th bundle, the first battery being adjacent to the second battery.

The first output terminal may be located at the first end, and the second output terminal may be located at the second end.

The first bundle through the 2N+1th bundle may be arranged in a closed curve and polarities of the bundles may alternate along the first or second end of the battery array.

The bundles may be arranged to have the polarities of the bundles alternate along a clockwise or counterclockwise loop.

The batteries may be arranged into a plurality of rows, and one bundle in a first row of the rows or a last row of the rows may be arranged horizontally and remaining bundles of the bundles may be arranged vertically.

An extension tab may extend from the first output terminal to an outer surface of a corresponding battery of the batteries where the second output terminal is located.

The extension tab may be integrally provided with the first output terminal.

The extension tab may be welded to the first output terminal.

In one embodiment of the present invention, a battery pack includes: a plurality of batteries arranged into 2N+1 bundles electrically coupled in series, polarities of a first bundle through a 2N+1th bundle of the bundles alternating along one end of the battery pack (where N is a natural number); a plurality of connection tabs, each of the connection tabs being coupled to a corresponding pair of the bundles to electrically couple the bundles in series; a first output terminal having a first polarity, and electrically coupled to the first bundle; a second output terminal having a second polarity, and electrically coupled to the 2N+1th bundle, the 2N+1th bundle being adjacent to the first bundle; a protection circuit module coupled with the first and second output terminals; and a case enclosing the batteries, the connection tabs, the first and second output terminals, and the protection circuit module.

Each of the bundles may include M+1 batteries of the batteries arranged in parallel (where M is a natural number).

The battery pack may further include a holder case between the batteries and the case.

The bundles may be arranged in a closed curve.

The first output terminal may be located at an outer surface of a battery of the batteries, and the battery pack may further include an extension tab extending from the first output terminal to the outer surface of the battery where the second output terminal is located.

The extension tab may be integrally provided with the first output terminal.

The extension tab may be welded to the first output terminal.

The first output terminal may be at a side of a first battery of the first bundle, and the second output terminal may be at a side of a second battery of the 2N+1th bundle, the first battery being adjacent to the second battery.

The first output terminal may be located at a first end, and the second output terminal may be located at a second end opposite to the first end.

According to one embodiment of the present invention, a battery array includes: a plurality of batteries arranged into a plurality of bundles; a plurality of connection tabs arranged at a first end of the battery array and at a second end of the battery array, each of the connection tabs being coupled to a corresponding pair of the bundles to electrically couple a first bundle through a last bundle of the bundles in series; a first output terminal having a first polarity, and electrically coupled to the first bundle, the first output terminal being at the first end and at a side of a first battery of the batteries; and a second output terminal having a second polarity, and electrically coupled to the last bundle, the second output terminal being at the second end and at a side of a second battery of the batteries adjacent to the first battery.

BRIEF DESCRIPTION OF THE DRAWINGS

The accompanying drawings, together with the specification, illustrate exemplary embodiments of the present invention, and, together with the description, serve to explain the principles of the present invention.

FIG. 3A is a conceptual diagram illustrating positions of batteries at each end of the battery array;

FIG. 3B is a conceptual diagram of the battery array projected from one end;

DETAILED DESCRIPTION

Figure 1A:
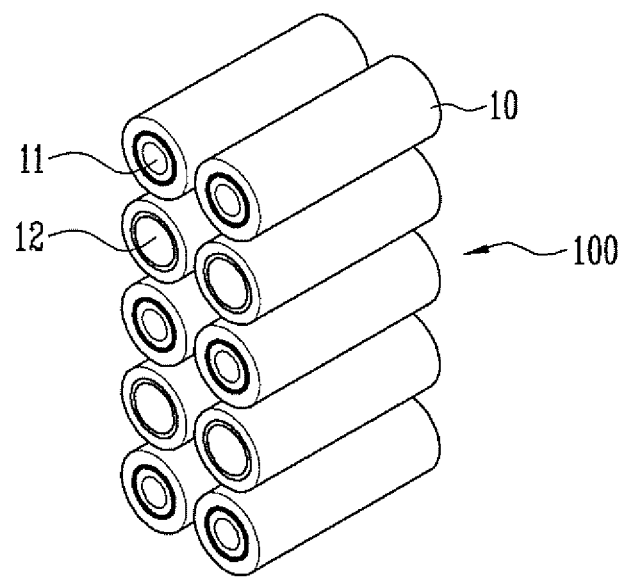
FIG. 1A is a perspective view showing a battery array of batteries coupled in parallel/in series.

In the following detailed description, only certain exemplary embodiments of the present invention are shown and described, by way of illustration. As those skilled in the art would recognize, the invention may be embodied in many different forms and should not be construed as being limited to the embodiments set forth herein. Also, in the context of the present application, when an element is referred to as being "on" another element, it can be directly on the another element or be indirectly on the another element with one or more intervening elements interposed therebetween. Like reference numerals designate like elements throughout the specification.

Hereinafter, exemplary embodiments of the present invention will be described with reference to the accompanying drawings. The terms representing directions, such as "up, down, left, right" used herein are considered to be based on the status shown in the drawings, if not specifically defined or stated. Further, the same reference numerals represent the same parts throughout the embodiments.

When a device is designed to use a voltage that is higher than the voltage of a single battery, a plurality of batteries is connected in series into a battery array in order to increase the voltage (or output voltage) of the battery array. When the capacity (or current) that the device is designed to draw is larger than a single battery is capable of supplying efficiently, a plurality of batteries is connected in parallel into a battery array in order to increase the capacity (or output current) of the battery array. In this way, a plurality of batteries may be connected and used in parallel or in series in order to provide a battery array capable of supplying a voltage and current (or a set or predetermined voltage and capacity). A plurality of batteries connected in series or in parallel is referred to herein as a battery array. In addition, y batteries connected in parallel are referred to herein as one bundle. Further, a structure of x bundles connected in series, each bundle including y batteries connected in parallel is referred to herein as xSyP (x Series y Parallel).

A method of arranging and connecting the batteries according to one embodiment of the present invention can be described as follows.

First step: Divide the batteries into bundles in accordance with the number of batteries that are to be connected in parallel in each bundle.

Second step: Dispose the bundles in accordance with the connection order.

Third step: Connect the batteries in each bundle and connect the bundles in series.

However, the third step is provided to help explain the connection of the batteries, it does not imply that the bundles should be electrically connected or connected by specific members.

Figure 1B:
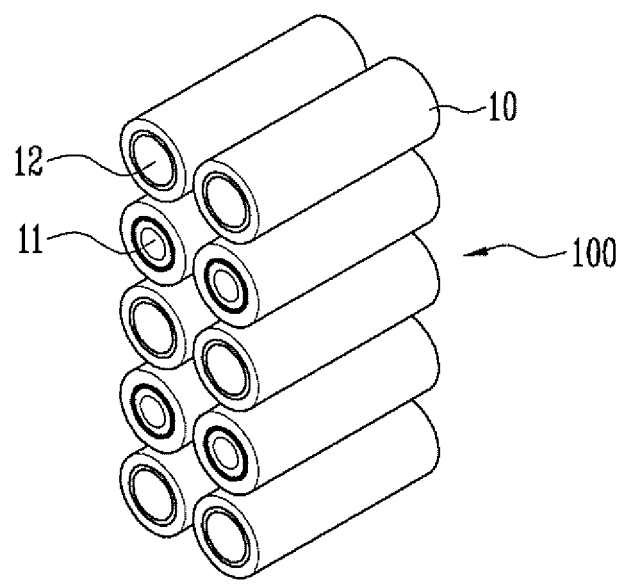
FIG. 1B is a perspective view showing the other end of the battery array of FIG. 1A.

According to one embodiment the connection configuration of a 5S2P battery array is described hereafter in accordance with the above method. First, FIG. 1A is a perspective view showing a multi-battery array of batteries coupled in parallel/in series, and FIG. 1B is a perspective view showing the other end of the battery array of FIG. 1A.

First, the batteries are divided into bundles. 2P indicates the number of batteries that are to be connected in parallel, that is, the number of batteries of a bundle. Therefore, each of the bundles are composed of two batteries of the ten batteries 10, with the terminals (or electrodes) of the two batteries of each bundle arranged in the same way. In this configuration, the total number of bundles is five. This is 5S, that is, the same as the number of bundles that are to be connected in series.

The bundles are arranged to connect the bundles in series. FIG. 1A shows an example of a battery array 100 composed of a plurality of batteries 10 arranged in a 5S2P structure. The bundles are stacked on one another. In this configuration, on one end of the arrangement, it can be seen that anodes 11 are positioned at the uppermost position, and electrodes of the bundles are alternately arranged downward (or along the stack). As shown in FIG. 1B, on the opposite end of the battery array, the electrodes of the batteries are arranged opposite to the electrodes of the batteries shown in FIG. 1A, at the other end of the batteries. That is, cathodes 12 are positioned at the uppermost position of the opposite end, and the electrodes of the bundles are alternately arranged downward.

Figure 2A:
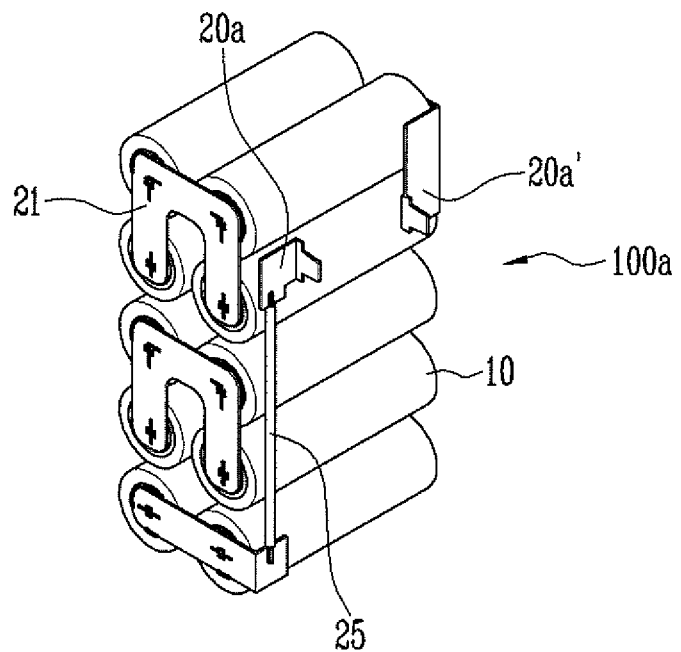
FIG. 2A is a perspective view showing when the batteries of the battery array of FIG. 1A are coupled together by connection tabs.
Figure 2B:
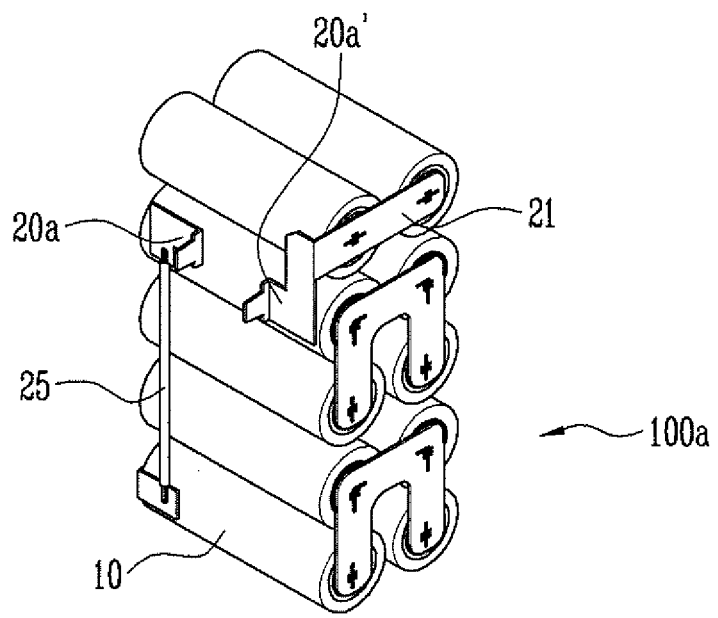
FIG. 2B is a perspective view showing the other end of the battery array of FIG. 2A.

Next, connection relationship of the battery array 100 is described in accordance with the third step. FIG. 2A is a perspective view showing when the batteries are connected by connection tabs 21, as shown in FIG. 1A, and FIG. 2B is a perspective view showing the other end of the embodiment shown in FIG. 2A.

As shown in the embodiment shown in FIG. 2A, two batteries 10 are connected in each bundle. This is applied in the same way to opposite end as shown in FIG. 2B. Next, the bundles are connected in series between the output terminals 20a and 20a'. In this configuration, an additional conductor 25 is used in order to reduce the distance between the output terminals 20a and 20a', which is disadvantageous economically and spatially.

Aspects of embodiments of the present invention provides a battery array 100 having an arrangement structure to reduce the distance between the output terminals 20 and 20' in the battery array 100, as shown in FIGS. 4A, 4B, 4C, and 4D. That is, embodiments of the present invention provide a battery array 100 that includes a plurality of batteries 10, a plurality of connection tabs 21 connecting the batteries 10, a first output terminal 20 positioned at one end of any one of the batteries, and a second output terminal 20' positioned at the other end of the battery adjacent to the battery having or directly connected to the first output terminal 20.

A coordinate system as shown in FIGS. 3A and 3B may be used to explain the arrangement of the batteries of according to one embodiment of the present invention. FIG. 3A is a conceptual diagram illustrating positions of batteries at one end of a battery array, and FIG. 3B is a conceptual diagram of a battery array, projected from one end. In the battery array shown in FIG. 3A, the coordinates are used when one end and the other with the electrodes are directly seen. The coordinates of FIG. 3B are used when the battery array are projected from one end to the other end. In this configuration, the coordinates of the other end are the same as when it is directly seen, that is, when the structure of FIG. 3B is horizontally rotated, e.g., when the structure of FIG. 3B is horizontally turned 180° along a vertical axis, the structure will appear the same as it does in FIG. 3A.

Referring to FIGS. 3A and 3B, the battery array 100 are arranged in total 5 rows and two columns of total ten batteries, when seen from one end. Here, it is assumed that the left first column is composed of five batteries (1,1), (2,1), (3,1), (4,1) and (5,1) arranged into five rows and the right second column is composed of five batteries (1,2), (2,2), (3,2), (4,2) and (5,2) arranged into five rows. Further, FIG. 3B is a conceptual diagram projecting the arrangement of FIG. 3A from the front to the rear, in which the position of the rows of the rear is the same as the front, but the coordinates of the columns are spatially opposite.

Hereinafter, two batteries arranged in parallel are described as one bundle, as described above. In one embodiment, a bundle includes a pair of batteries arranged in parallel with the polarities arranged in the same direction, and the bundles may be horizontally or vertically arranged in the battery array 100 of embodiments of the present invention.

Embodiments of the present invention include battery arrays having a (2N+1)S(M+1)P structure, in which two or more batteries (M+1)P arranged in parallel is referred to as a bundle and total (2N+1) bundles are connected in series, where N and M are natural numbers. Hereinafter, embodiments having structures 5S2P, 7S2P, 3S2P, 3S3P and 3S4P are described.

Embodiment 1

Figure 4A:
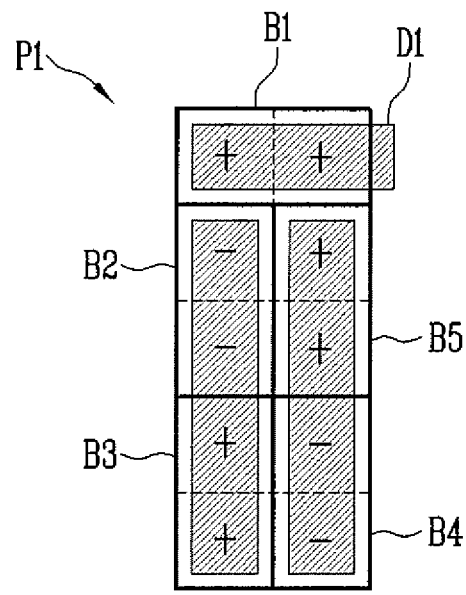
FIG. 4A is a conceptual diagram showing one end of a 5S2P battery array according to one embodiment of the present invention.
Figure 4B:
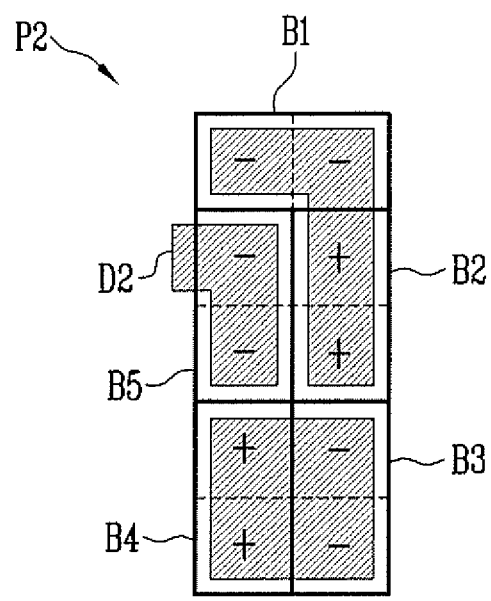
FIG. 4B is a conceptual diagram showing the other end of the battery array of the embodiment shown in FIG. 4A.
Figure 4C:
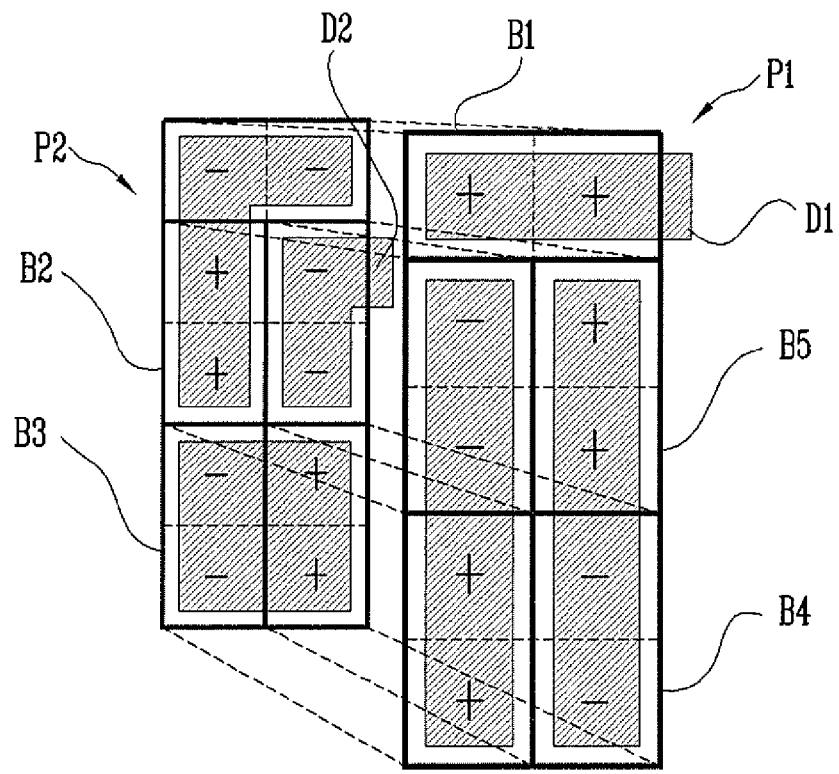
FIG. 4C is a conceptual diagram of the battery array of the embodiment shown in FIG. 4A, projected from one end to the other end.

Embodiment 1 is an embodiment of the present invention in which N is 2 and M is 1, that is, a 5S2P battery array. The battery array 100 of Embodiment 1 is described in accordance with the arrangement order of batteries described above. FIG. 4A is a conceptual view showing one end P1 where the electrodes of the battery array are arranged, and FIG. 4B is a conceptual view showing another end P2. FIG. 4C shows the end P1 and the other end P2 projected from the end P1. As described above, when the other end P2 of FIG. 4C is horizontally rotated along a vertical axis, the arrangement of the batteries appears the same as in FIG. 4B.

Figure 4D:
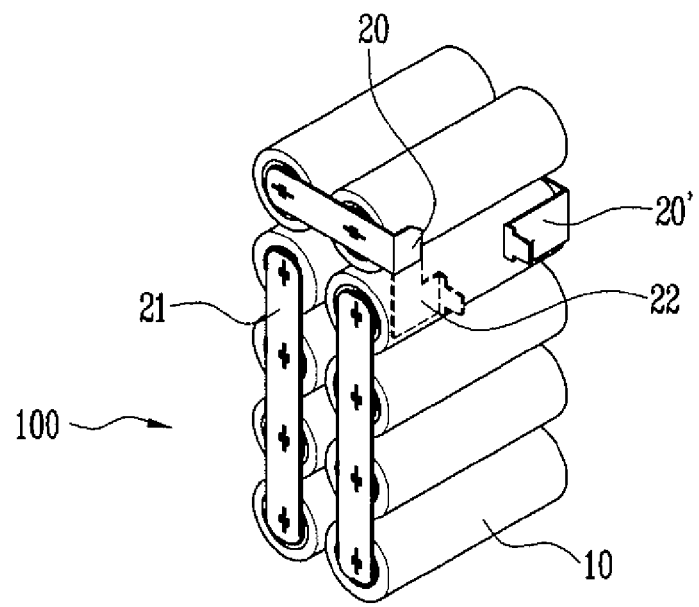
FIG. 4D is a perspective view showing one end of the battery array of the embodiment shown in FIG. 4A.

Embodiment 1 of the present invention, as shown in FIG. 4D, includes a battery array 100 that includes a plurality of batteries 10, connection tabs 21 connecting the batteries 10, a first output terminal 20 positioned at one end of any one of the batteries, and a second output terminal 20' positioned at the other end of the battery adjacent to the battery having the first output terminal 20.

In this configuration, one bundle is composed of two parallel batteries (2P) in this embodiment, as described above. In Embodiment 1, a total of five bundles (5S) are provided.

In one embodiment of the present invention, the bundles are arranged at one end P1 in the arrangement shown in FIG. 4A, so that the bundles can be connected in series to form a closed curve. A first bundle B1 is horizontally arranged in the first column and the second column of the first row such that the anodes of the first bundle B1 are shown. Next, the second bundle B2 is vertically arranged in the second and third rows of the first column and the third bundle B3 is vertically arranged in the fourth and fifth rows of the first column such that the cathodes and the anodes of the second bundle B2 and the third bundle B3 are alternately arranged. Next, the fourth bundle B4 and the fifth bundle B5 are arranged in a manner inverse to the second bundle B2 and the third bundle B3 from the fifth row to the second row of second column, with the cathodes and the anodes alternately arranged.

That is, in Embodiment 1, the first bundle B1 is horizontally arranged with the anodes at the front end (e.g., end P1) in the first and second columns of the first row, the second bundle B2 is arranged in the second and third rows of the first column such that the cathodes are shown, and the third bundle B3 is sequentially vertically arranged in the fourth and fifth rows of the first column such that the anodes are shown. Thereafter, the fourth bundle B4 is vertically arranged in the fifth and fourth rows of the second column such that the cathodes are shown and the fifth bundle B5 is vertically arranged in the third and second rows of the second column such that the anodes are shown. In this arrangement, the polarities of the bundles are shown in opposite way on the other end P2, as shown in FIG. 4B. This can be clearly seen from the conceptual projection diagram of FIG. 4C. In addition, the position of the first bundle is not limited. That is, as in this embodiment, the first bundle may be arranged in the position of the second to fifth bundles, as long as the top bundle is arranged in the first and second columns of the first row.

Next, the connection relationship of the batteries according to one embodiment of the present invention is described with reference to FIG. 4C. The arrangement of rows and columns described below on the basis of FIG. 3B and connection tabs are shown as the shaded or darkened portions in the figures.

First, the batteries of each bundle are connected.

Next, the first bundle B1 through the fifth bundle B5 are sequentially connected in series. That is, the first bundle B1 and the second bundle B2 are sequentially connected at the other end P2, and the second bundle B2 and the third bundle B3 are sequentially connected at the end P1. Thereafter, the third bundle B3 and the fourth bundle B4 are sequentially connected at the other end P2, and the fourth bundle B4 and the fifth bundle B5 are sequentially connected at the end P1. In this configuration, an anode output terminal 20 can extend from the connection tab in the first row and second column (1,2) on the end P1, and the cathode output terminal 20' can extend from the connection tab in the second row and first column (2,1) on the other end P2.

The battery array 100 according to Embodiment 1 is shown in FIG. 4D. In this case, unlike the common 5S2P battery array 100a (see FIG. 2A), the distance between the anode and the cathode output terminal 20, 20' can be reduced or minimized. The locations of the anode and the cathode output terminals 20 and 20' depend on the arrangement positions of the first bundle to the fifth bundle, such that they can be formed at any location in the battery array 100.

Further, an extension tab 22 may be formed at any one of the anode and cathode output terminals 20, 20' in order to further reduce the distance between the output terminals 20, 20', with the anode output terminal 20 at the outer circumference of the same battery 10. In one embodiment, the extension tab 22 extends from any one of the anode output terminals 20 to the outer circumference of the battery 10 where the cathode output terminal 20' is positioned. Furthermore, in embodiments of the present invention, the additional extension tab 22 can be provided as a single body extended from (or integrally provided with) the anode output terminal 20 or a separate body coupled to the anode output terminal 20 by welding.

In the embodiments depicted in the figures described above, a cylindrical battery 10 is used in the battery array 100, however the shape of the battery is not specifically limited (e.g., prismatic batteries). Further, the connection tab 21 of this embodiment may be made of nickel or a nickel alloy.

In some embodiments, the anode and the cathode may be exchanged from their positions in Embodiment 1, and the same result can be achieved even if the configuration of FIGS. 4A and 4B is horizontally or vertically turned (or flipped) to have a configuration symmetric to the configuration of FIGS. 4A and 4B.

Figure 4E:
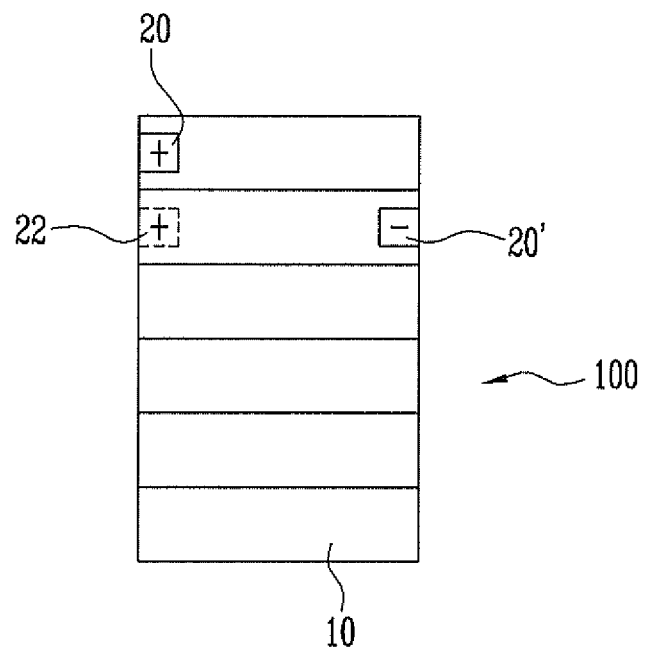
FIG. 4E is a front view schematically showing the locations of output terminals of the battery array of the embodiment shown in FIG. 4A.

FIG. 4E is a side view of one end the battery array 100 of FIG. 4D according to one embodiment of the present invention, in which the anode output terminal 20 and the cathode output terminal 20' are shown. The additional extension tab 22 can allow the anode output terminal 20 to extend toward the lower battery 10 to be located on the outer circumference of the battery 10 where the cathode output terminal 20' is located.

Figure 4F:
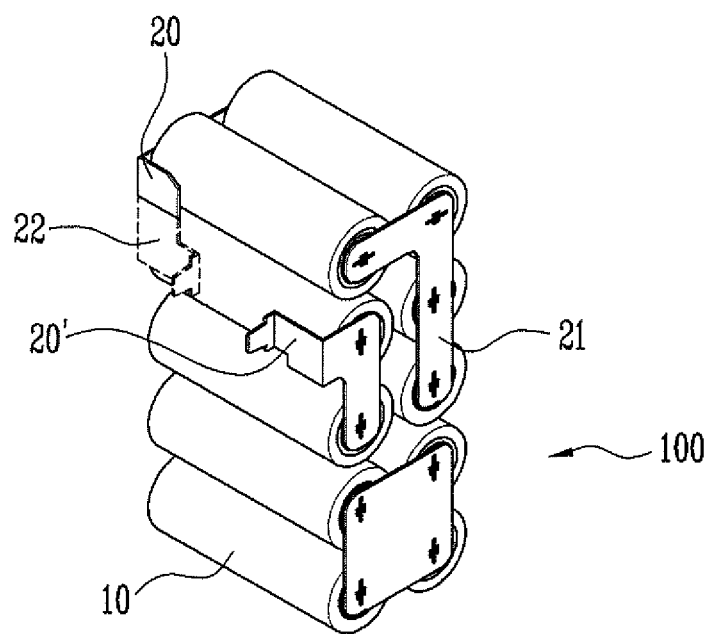
FIG. 4F is a perspective view showing the other end of the battery array of the embodiment shown in FIG. 4A.

FIG. 4F is a perspective view of the battery array 100 according to one embodiment of the present invention, seen from the other side, which shows the connection relationship of the connection tabs 10 shown in FIG. 4C.

Figure 4G:
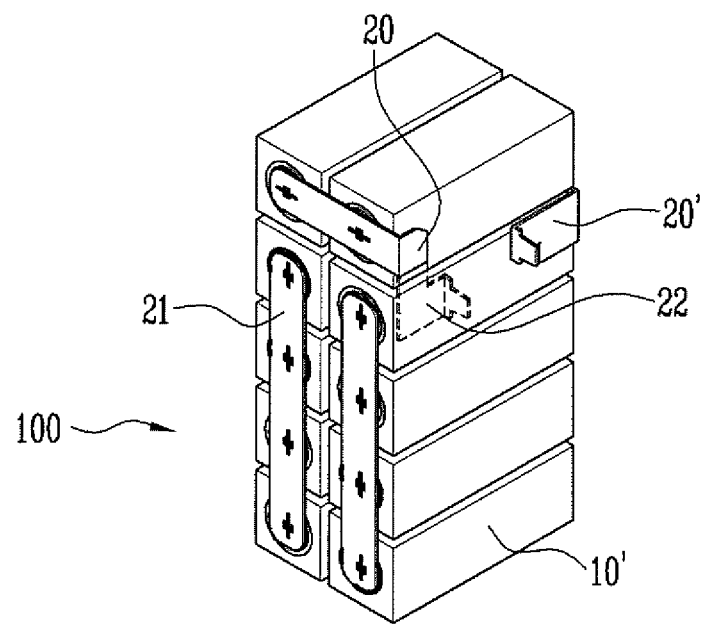
FIGS. 4G, 4H, and 4I show alternative embodiments of the present invention in which the individual batteries are arranged in substantially the same configuration as the embodiments shown in FIGS. 4A through 4F, but wherein individual batteries have different shapes.
Figure 4H:
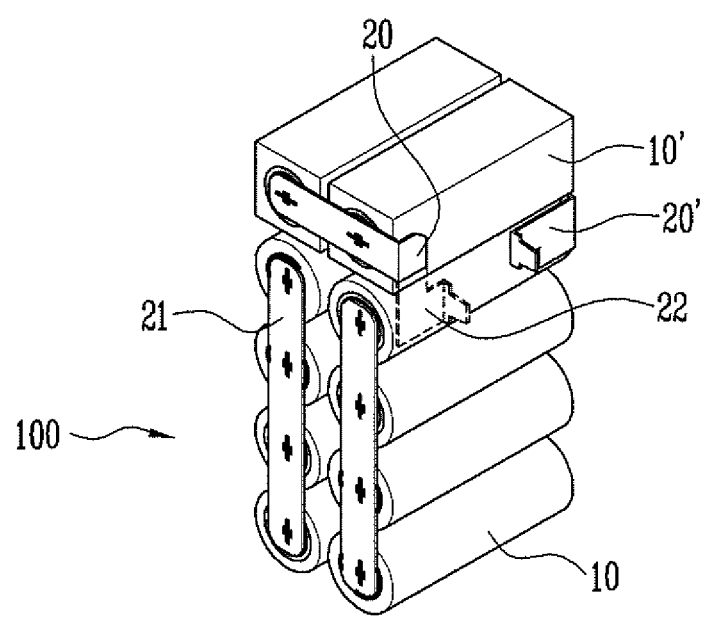
Figure 4I:
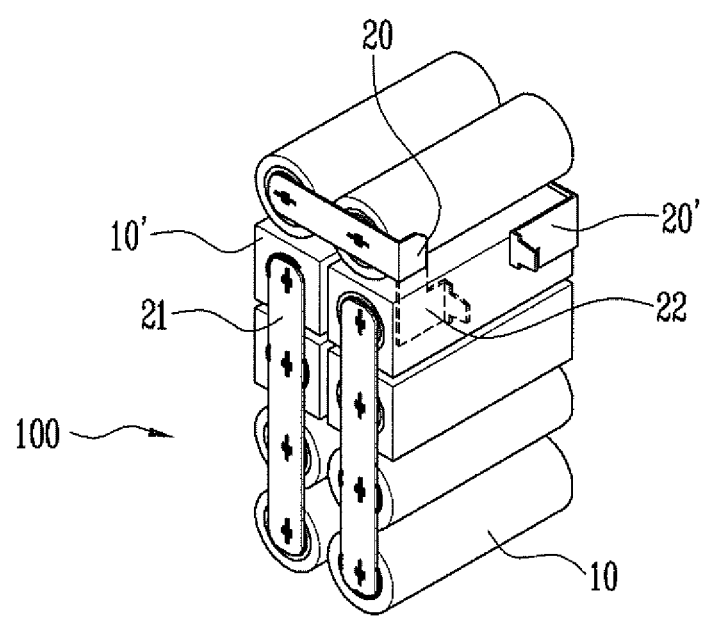

FIGS. 4G, 4H, and 4I are perspective views of the battery array 100 according to embodiments of the present invention in which at least some of the battery cells are prismatic. FIG. 4G is a perspective view of an embodiment in which all of the battery cells are prismatic. FIG. 4H is a perspective view of an embodiment in which the top bundle includes prismatic battery cells. FIG. 4I is a perspective view of an embodiment in which some of the battery cells not at the top or bottom are prismatic.

Embodiment 2

Embodiment 2 is an embodiment of the present invention in which N is 3 and M is 1, that is, a 7S2P battery array.

First, as in Embodiment 1, the batteries are divided into bundles. One bundle is composed of two batteries (2P) and a total of seven bundles (7S) are provided in this embodiment.

Figure 5A:
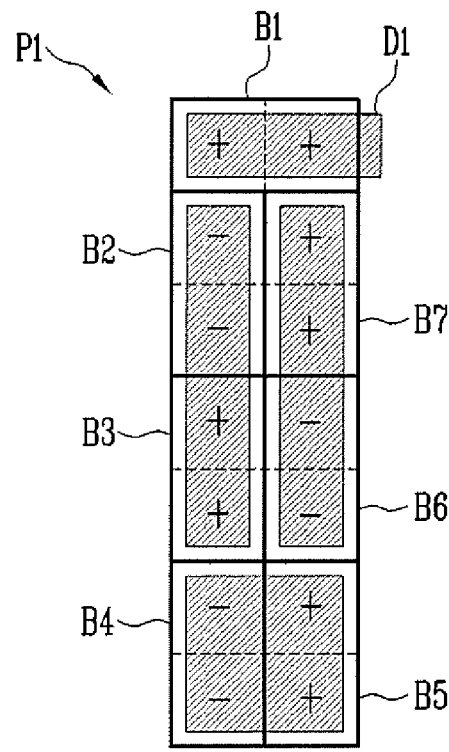
FIG. 5A is a conceptual diagram showing one end of a 7S2P battery array according to one embodiment of the present invention.
Figure 5B:
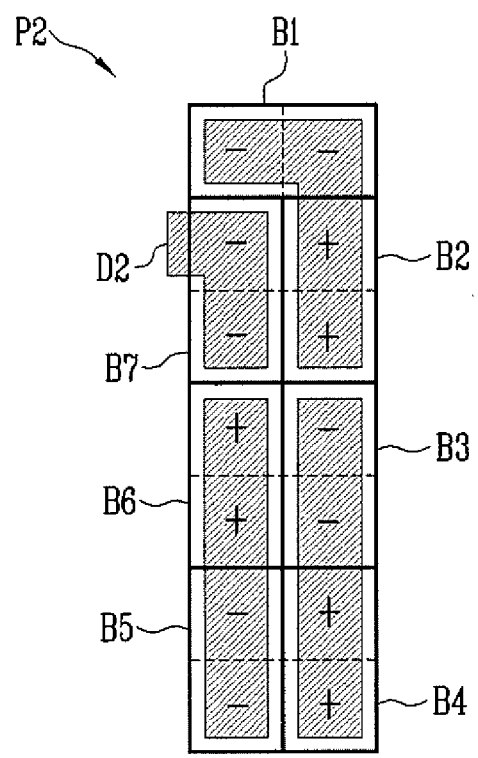
FIG. 5B is a conceptual diagram showing the other end of the battery array of the embodiment shown in FIG. 5A.

In one embodiment of the present invention, the bundles are arranged. In Embodiment 2, as shown in FIG. 5A, at one end P1, a first bundle B1 is arranged in the first row such that the anode is shown, and a second bundle B2 to a seventh bundle B7 are sequentially vertically arranged counterclockwise from the second column and the first row (2,1) such that the first bundle to the seventh bundle construct a closed curve along one end P1. In this arrangement, the bundles are arranged such that opposite polarities are alternately shown. As shown in FIG. 5B, the polarities of the bundles are shown in the opposite way at the other end P2.

Figure 5C:
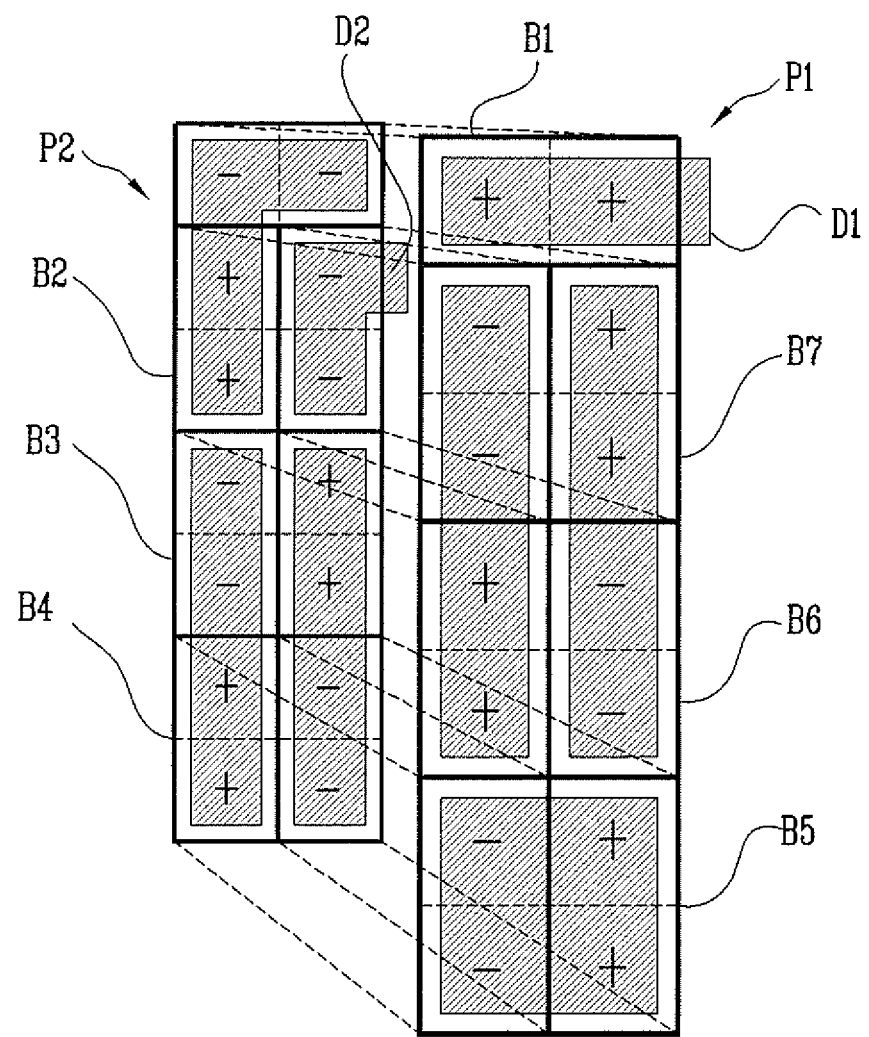
FIG. 5C is a conceptual diagram of the battery array of the embodiment shown in FIG. 5A, projected from one end to the other end.

FIG. 5C is a conceptual diagram of the battery array of the embodiment shown in FIG. 5A, projected from one end to the other end.

In one embodiment, the connection tabs are disposed in the same way as in Embodiment 1. That is, the connection tabs are provided to connect or to be able to connect the batteries of each bundle, and to connect the first bundle B1 through the seventh bundle B7 in series.

In addition, Embodiment 2 is similar to Embodiment 1 in that the polarities may be changed and the battery array may be symmetric. Further, output terminals D1 and D2 may have features and may be explained in a manner similar to that of Embodiment 1.

Embodiment 3

Figure 6A:
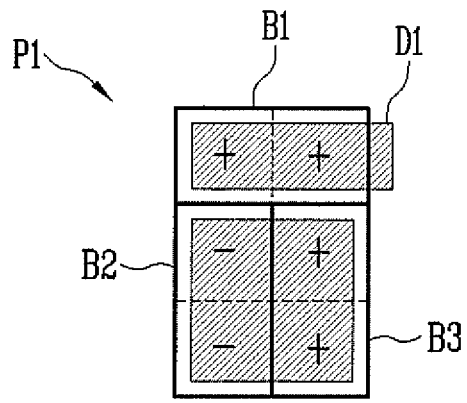
FIG. 6A is a conceptual diagram showing one end of a 3S2P battery array according to one embodiment of the present invention.
Figure 6B:
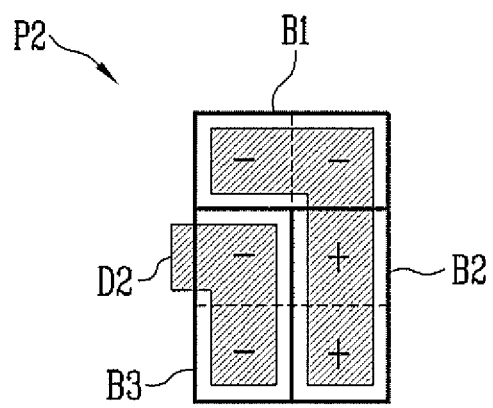
FIG. 6B is a conceptual diagram showing the other end of the battery array of the embodiment shown in FIG. 6A.
Figure 6C:
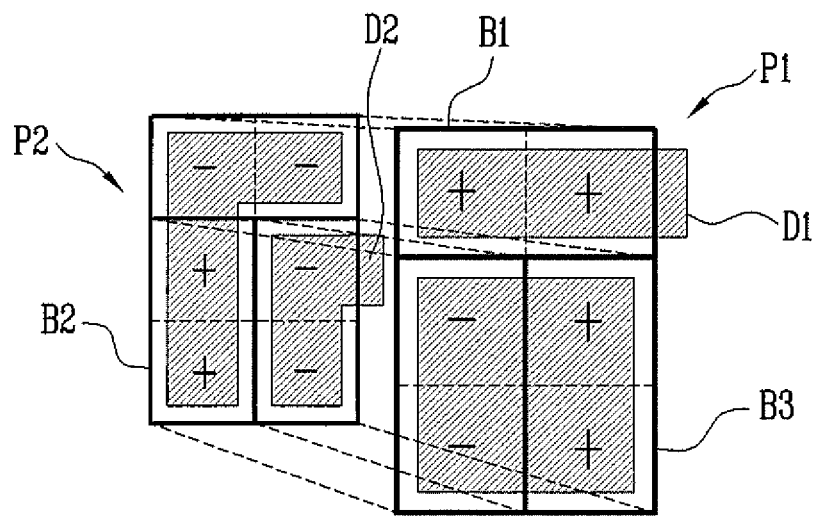
FIG. 6C is a conceptual diagram of the battery array of the embodiment shown in FIG. 6A, projected from one end to the other end.

Embodiment 3 is an embodiment of the present invention in which N is 1 and M is 1, that is, a 3S2P battery array. Embodiment 3 is described with reference to FIGS. 6A, 6B, and 6C. FIG. 6A is a conceptual diagram showing one end of the 3S2P battery array according to one embodiment of the present invention, and FIG. 6B is a conceptual diagram showing the other end of the battery array of FIG. 6A. FIG. 6C is a conceptual diagram of the battery array of FIG. 6A, projected from one end to the other end.

In the 3S2P battery array, as shown in FIG. 6A, a first bundle B1 is horizontally arranged in the first column and the second column of the first row, and then a second bundle B2 and a third bundle B3 are vertically counterclockwise arranged, at one end P1. The first bundle to the third bundle form a closed curve, similar to Embodiment 1 described above. In this arrangement, the second bundle and the third bundle are arranged such that the cathode and the anode are shown, respectively. The polarities of the batteries are opposite at the other end (or the second end) P2 to those at one end (or the first end) P1. This can be clearly understood from FIG. 6C.

Embodiment 4

Embodiment 4 is an embodiment of the present invention which relates to a common arrangement method that can be applied to all of the 5S2P, 7S2P, and 3S2P, which are described above, and (2N+1)S2P (N is a natural number) battery array.

First, it is possible to implement a battery array by arranging batteries in a bundle unit and connecting the arranged bundles in series. In one embodiment of the present invention, the process of connecting the arranged bundles is to sequentially connect the bundles in series. Therefore, a method of implementing a (2N+1)S2P battery array will be generalized from several steps of a battery arrangement method used with the embodiments described above. Meanwhile, once the polarities of the batteries are arranged at one end, the polarities at the other end are correspondingly determined. Therefore, describing the arrangement of the polarities at one end is enough for the polarity arrangement of the batteries.

According to one embodiment of the present invention, the battery polarity arrangement for implementing (2N+1)S2P battery array (N is a natural number) is based on the steps as follows.

Step 1. Divide the batteries into (2N+1) bundles by dividing all of the batteries into bundles of two parallel batteries.

Step 2. Sequentially arrange the first bundle through the (2N+1) bundle to construct a closed curve.

Step 3. Arrange the bundles such that the anodes and the cathodes are alternately shown at one end.

The method will be applied to determine whether Embodiment 1 can be arranged using these steps, with reference to FIG. 4C, in order to verify the above steps. At the end R1 in Embodiment 1, it can be seen that the batteries are configured into bundles of which the same terminals are connected. Further, the first bundle B1 through the fifth bundle B5 are sequentially arranged to be adjacent to each other. In this arrangement, it can be seen that the last bundle, the fifth bundle B5, is arranged adjacent to the first bundle and the first bundle through the fifth bundle construct a closed curve. Therefore, Embodiment 1 can be arranged using the three steps described above. Embodiment 2 and Embodiment 3 can also be arranged using the three steps.

Meanwhile, the first bundle B1 and the fifth bundle B5 show the same polarities at the end P1. This is the same in the generalized configuration. That is, the first bundle B1 and the (2N+1)-th bundle show the same polarities at the same end. Therefore, when a terminal having positive or negative polarity is formed at the first bundle at a first end, a terminal having negative or positive polarity (e.g., a terminal having the same polarity of the first bundle) is formed at the (2N+1)-th bundle at the second end, such that a pair of electrode terminals having positive and negative polarity can be formed, in this case, since the first bundle and the (2N+1)-th bundle are adjacent to each other, the distance between both terminals is short (or reduced or minimized).

The start position of the first bundle in the second step is not limited to those shown in Embodiments 1, 2, and 3. That is, the first bundle can be positioned anywhere in the battery array as long as it is possible to sequentially arrange all the bundle along a closed curve. That is, it may be arranged in the first row, as in Embodiments 1, 2, and 3, may be arranged in the last, the fifth row and any one of the first column and the second column.

Further, the bundles may be sequentially arranged clockwise or counterclockwise. This is due to the symmetry of the battery array.

Embodiment 5

A schematic structure of a battery pack having a battery array 100a described above is described with reference to Embodiment 4 and FIG. 7.

Figure 7:
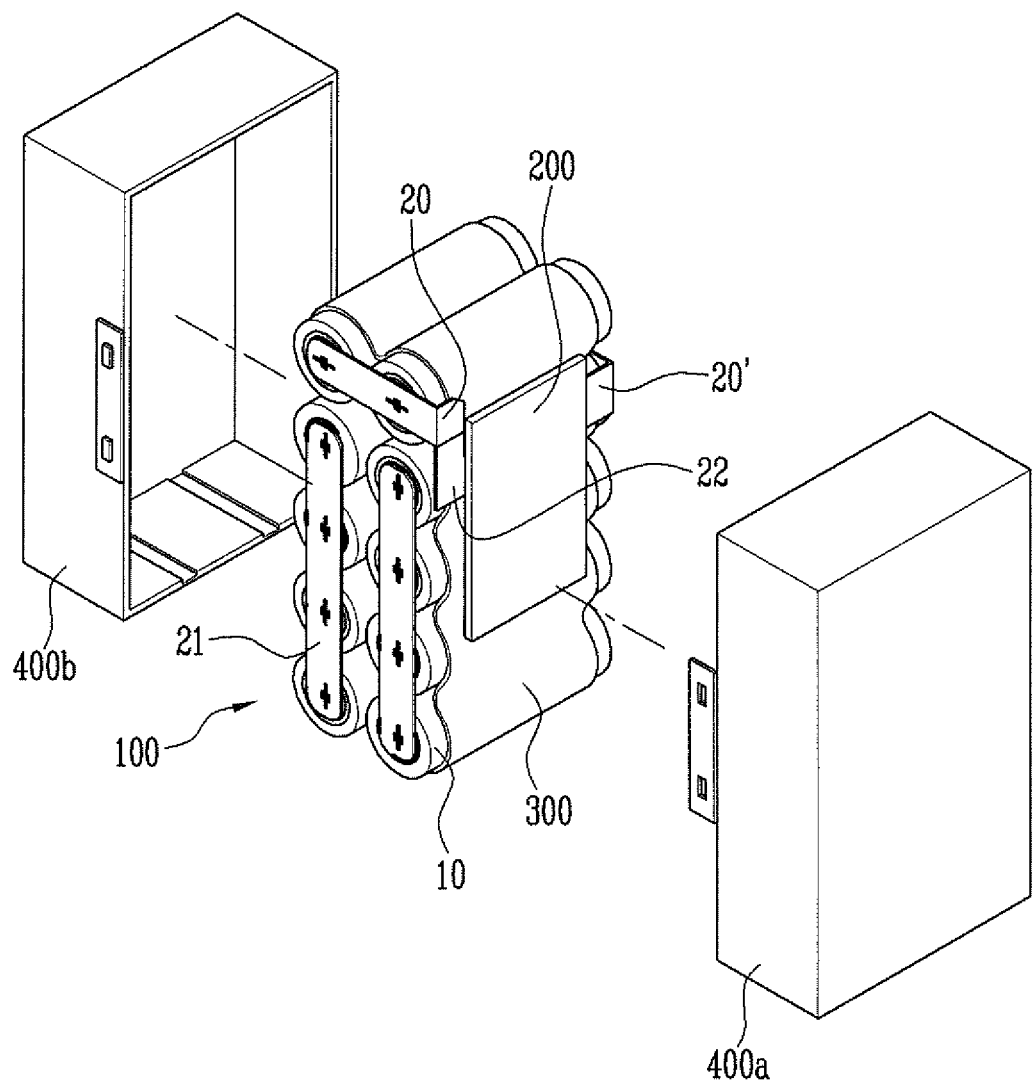
FIG. 7 is an exploded perspective view showing an embodiment of a battery pack having a battery array.

FIG. 7 is an exploded perspective view showing an embodiment of a battery pack having a battery array.

Both output terminals 20 and 20' are connected to terminals for protection circuit modules (PCM) 200 on a printed circuit board. In this configuration, it is possible to further form the extension tab to further reduce the gap between the terminals, as described above. In this case, the extension tab 22 and the other output terminal (20 or 20') without the extension tab 22 are connected to the protection circuit module 200.

A case is a part that accommodates and supports the battery. The case can be divided into a holder case 300 and outer cases 400a, 400b. The holder case 300 supports the arranged battery array 100 and functions as a support where the protection circuit module 200 is fixed. The outer cases 400a, 400b protect the components therein against external shock. The outer cases 400a, 400b may have a connecting portion (not shown) that connects the protection circuit module 200 with an external circuit, if needed.

Embodiment 6

Figure 8:
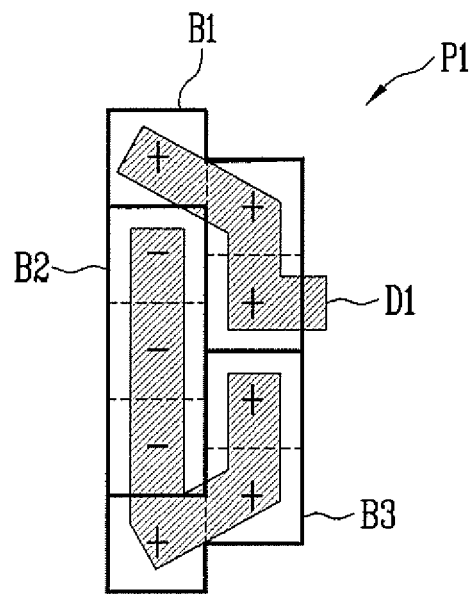
FIG. 8 is a conceptual diagram showing one end of a 3S2P battery array according to one embodiment of the present invention.

Embodiment 6 is described with reference to FIG. 8. FIG. 8 is a conceptual diagram showing one end of a 3S2P battery array according to one embodiment of the present invention.

Embodiment 6 is a 3S3P battery array according to one embodiment of the present invention. That is, one bundle is composed of three parallel batteries in this embodiment. This arrangement corresponds to battery arrays when (M+1) is an odd number in the (2N+1)S(M+1)P battery array (N and M are natural numbers).

Since the number of bundles connected in series is an odd number, the total number of batteries is a odd number when the number of batteries of one bundle is an odd number. Therefore, as shown in FIG. 8, the numbers of batteries is different in the first column and the second column.

In the 3S3P battery array, a first bundle B1 is arranged from the first and second rows of the second column to the first row of the first column at one end of the battery array (P1). Thereafter, a second bundle B2 is arranged from the second row of the first column to the fourth row of the first column. Similarly, a third bundle B3 is arranged from the fifth row of the first column to the third and fourth rows of the second column. The first to third bundles B1, B2, and B3 are arranged on one closed curve, and the polarities of the bundles are alternately arranged. Therefore, it can be seen that this embodiment can also be arranged using the three steps described in Embodiment 4.

Meanwhile, at the other end P2, as described above, the arrangement is opposite to the end P1, in which the bundles are connected in accordance with the three steps of Embodiment 4 described above. Further, since the first bundle and the last, the third bundle are arranged to show the same polarities, the arrangement also follows the three steps of Embodiment 4 described above. However, Embodiments 1 to 3 described above have a difference in that the start point of the first bundle B1 is the second row of the second column. Therefore, the output terminal is formed at the center portion of the battery array in this embodiment.

Embodiment 7

Figure 9:
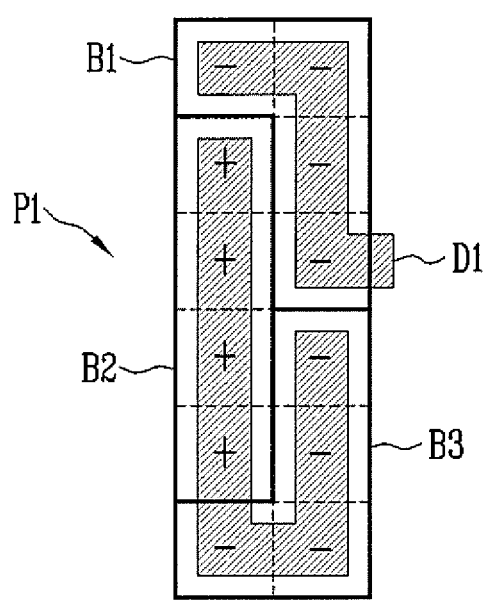
FIG. 9 is a conceptual diagram showing one end of a 3S4P battery array according to one embodiment of the present invention.

Embodiment 7 is described with reference to FIG. 9. FIG. 9 is a conceptual diagram showing one end of a 3S4P battery array according to one embodiment of the present invention.

Embodiment 7 exemplifies a 3S4P battery array according to one embodiment of the present invention. That is, one bundle is composed of four parallel batteries in this embodiment. This corresponds when (M+1) is an even number in a (2N+1)S(M+1)P battery array (N and M are natural numbers).

As shown in FIG. 9, a first bundle B1 is arranged in the third to first rows of the second column and the first row of the first column. A second bundle B2 is arranged in the second to fifth rows of the first column. Similarly, a third bundle B3 is arranged in the sixth row of the first column and the sixth to the fourth rows of the second column. The first to third bundles B1, B2, and B3 are arranged along a closed curve and the polarities of the bundles are alternately arranged. Therefore, it can be seen that this embodiment also satisfies the three steps described in Embodiment 4.

The arrangement of the battery array at the other end, the connection of the bundles, and the forming the output terminal follow the three steps of Embodiment 4.

A battery pack according to embodiments of the present invention can reduce the distance between both electrode terminals, even if battery array includes a plurality of bundles each including a pair of batteries electrically coupled in parallel, wherein the plurality of bundles are connected in series. Further, an additional coupling member is not needed in embodiments of the present invention, thereby reducing the voltage drop due to the use of an additional coupling member.

As a result, according to the present invention, an additional or specific member or an additional process is not needed to reduce the distance between terminals.

A battery pack according to the present invention can minimize the distance between both electrode terminals, even if battery arrays are composed of a plurality of bundles composed of a pair of multi-parallel batteries. As a result, according to the present invention, a specific member or process is not needed to reduce the distance between terminals.

Although embodiments of the present invention were described above, the scope of the present invention is not limited to the embodiments and can be implemented by a variety of battery arrays and a battery pack including a battery array without departing from the scope of the present invention described in claims.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed:

1. A battery array comprising:
    a plurality of batteries arranged into 2N+1 bundles, each of the bundles comprising M+1 batteries of the batteries arranged in parallel, where N and M are natural numbers, and each of the batteries has a positive terminal and a negative terminal opposite the positive terminal;
    a plurality of connection tabs arranged at a first side of the battery array and at a second side of the battery array, each of the connection tabs being coupled to a corresponding pair of the bundles to electrically couple a first bundle through a 2N+1th bundle of the 2N+1 bundles in series;
    a first output terminal having a positive polarity, and connected to the positive terminal of each of the batteries of the first bundle;
    a second output terminal having a negative polarity, and connected to the negative terminal of each of the batteries of the 2N+1th bundle,
    a case enclosing the batteries, the connection tabs, and the first and second output terminals; and
    a holder case between each of the bundles and the case,
    wherein the 2N+1 bundles are arranged to have:
        the first bundle through the 2N+1th bundle arranged in a closed curve,
        the first bundle and the 2N+1th bundle at end bundles of the electrical series and the closed curve,
        the positive terminal of each of the batteries of the first bundle and the positive terminal of each of the batteries of the 2N+1th bundle at the first side of the battery array,
        the negative terminal of each of the batteries of the first bundle and the negative terminal of each of the batteries of the 2N+1th bundle at the second side of the battery array,
        at least one of the batteries of the first bundle adjacent to at least one of the batteries of the 2N+1th bundle, and the second output terminal adjacent to the first bundle.

2. The battery array of claim 1, wherein the first output terminal is at a side of a first battery of the first bundle, and the second output terminal is at a side of a second battery of the 2N+1th bundle, the first battery being adjacent to the second battery.

3. The battery array of claim 2, wherein the first output terminal is located at the first side, and the second output terminal is located at the second side.

4. The battery array of claim 1, wherein the first output terminal is located at the first side, and the second output terminal is located at the second side.

5. The battery array of claim 1, wherein polarities of the bundles alternate along the first or second side of the battery array.

6. The battery array of claim 5, wherein the bundles are arranged to have the polarities of the bundles alternate along a clockwise or counterclockwise loop.

7. The battery array of claim 1, wherein the batteries are arranged into a plurality of rows, and one bundle in a first row of the rows or a last row of the rows is arranged horizontally and remaining bundles of the bundles are arranged vertically.

8. The battery array of claim 1, further comprising an extension tab extending from the first output terminal to an outer surface of a corresponding battery of the batteries where the second output terminal is located.

9. The battery array of claim 8, wherein the extension tab is integrally provided with the first output terminal.

10. The battery array of claim 8, wherein the extension tab is welded to the first output terminal.

11. A battery pack comprising:
    a plurality of batteries arranged into 2N+1 bundles, where N is a natural number and each of the batteries has a positive terminal and a negative terminal opposite the positive terminal;
    a plurality of connection tabs, each of the connection tabs being coupled to a corresponding pair of the bundles to electrically couple a first bundle through a 2N+1 th bundle of the 2N+1 bundles in series;
    a first output terminal having a positive polarity, and connected to the positive terminal of each of the batteries of the first bundle;
    a second output terminal having a negative polarity, and connected to the negative terminal of each of the batteries of the 2N+1th bundle;
    a protection circuit module coupled with the first and second output terminals;
    a case enclosing the batteries, the connection tabs, the first and second output terminals, and the protection circuit module, and
    a holder case between each of the bundles and the case,
    wherein the 2N+1 bundles are arranged to have:
        the first bundle through the 2N+1th bundle arranged in a closed curve,
            the first bundle and the 2N+1th bundle at end bundles in the electrical series and the closed curve,
            the positive terminal of each of the batteries of the first bundle and the positive terminal of each of the batteries of the 2N+1th bundle at a first side of the battery pack, the negative terminal of each of the batteries of the first bundle and the negative terminal of each of the batteries of the 2N+1th bundle at a second side of the battery pack, polarities of the first bundle through the 2N+1th bundle of the 2N+1 bundles alternate along one side of the battery pack, and at least one of the batteries of the first bundle adjacent to at least one of the batteries of the 2N+1th bundle.

12. The battery pack of claim 11, wherein each of the bundles comprises M+1 batteries of the batteries arranged in parallel (where M is a natural number).

13. The battery pack of claim 11, wherein the first output terminal is located at an outer surface of a battery of the batteries, and wherein the battery pack further comprises an extension tab extending from the first output terminal to the outer surface of the battery where the second output terminal is located.

14. The battery pack of claim 13, wherein the extension tab is integrally provided with the first output terminal.

15. The battery pack of claim 13, wherein the extension tab is welded to the first output terminal.

16. The battery pack of claim 11, wherein the first output terminal is at a side of a first battery of the first bundle, and the second output terminal is at a side of a second battery of the 2N+1th bundle, the first battery being adjacent to the second battery.

17. The battery pack of claim 16, wherein the first output terminal is located at the first side, and the second output terminal is located at the second side opposite to the first side.

18. A battery array comprising:

a plurality of batteries arranged into 2N+1 bundles, where N is a natural number and each of the batteries has a positive terminal and a negative terminal opposite the positive terminal;

a plurality of connection tabs arranged at a first side of the battery array and at a second side of the battery array, each of the connection tabs being coupled to a corresponding pair of the bundles to electrically couple a first bundle through a last bundle of the bundles in series;

a first output terminal having a positive polarity, and connected to the positive terminal of each of the batteries of the first bundle, the first output terminal being at the first side and at a side of a first battery of the batteries of the first bundle;

a second output terminal having a negative polarity, and connected to the negative terminal of each of the batteries of the last bundle, the second output terminal being at the second side and at a side of a second battery of the batteries of the last bundle, and a case enclosing the batteries, the connection tabs, and the first and second output, and a holder case between each of the bundles and the case, wherein the 2N+1 bundles are arranged to have:

the first bundle through the last bundle arranged in closed curve, the first bundle and the last bundle at end bundles of the electrical series and the closed curve, the positive terminal of each of the batteries of the first bundle and the positive terminal of each of the batteries of the last bundle at the first side of the battery array, the negative terminal of each of the batteries of the first bundle and the negative terminal of each of the batteries of the last bundle are at the second side of the battery array, and the first battery adjacent to the second battery.

19. The battery array of claim 1, wherein the second output terminal is connected to the negative terminal of a battery of the batteries that is closest to the negative terminal of at least one of the batteries of the first bundle.

* * * * *